Figure 1:
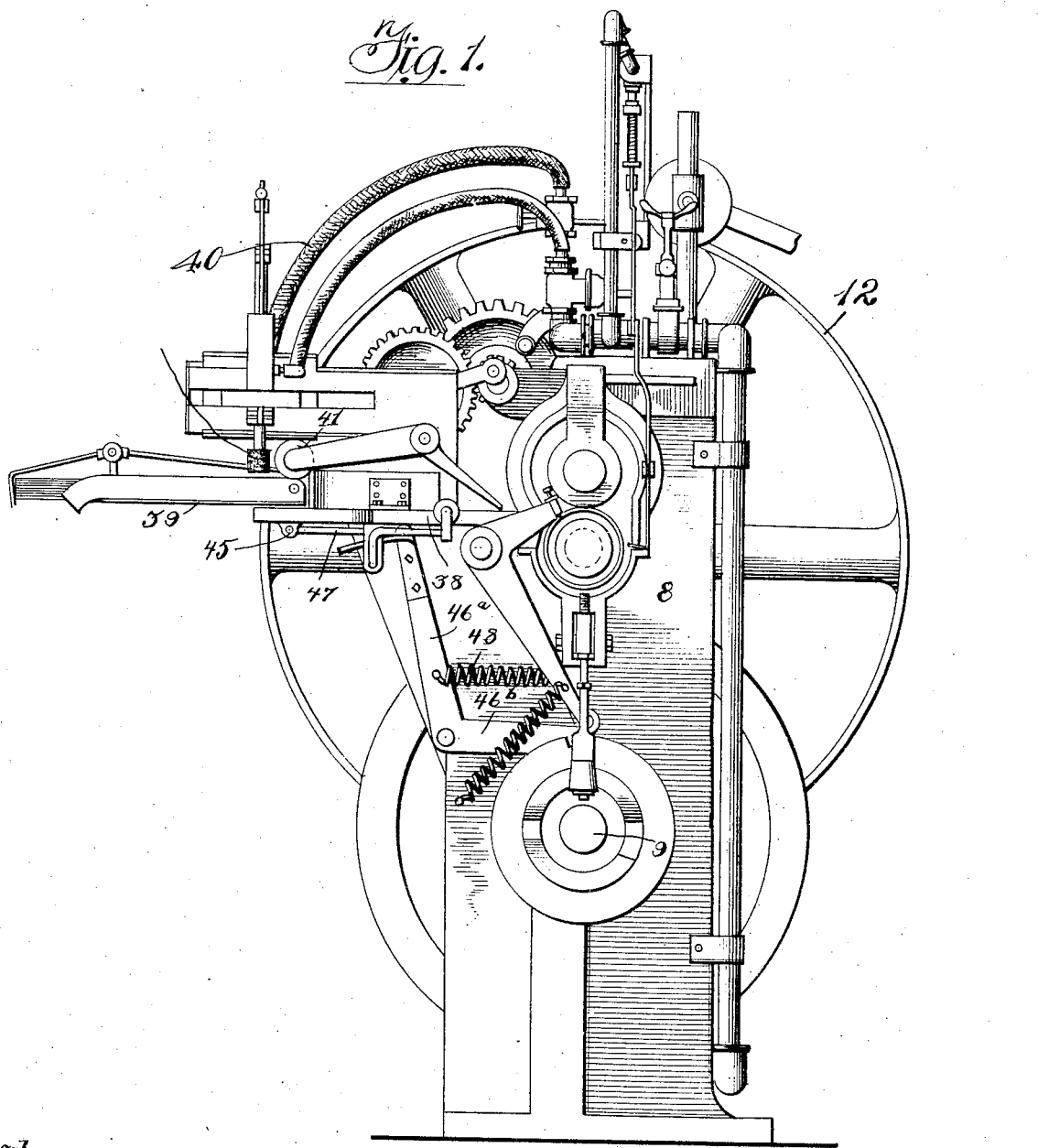

No. 786,302. PATENTED APR. 4, 1905.
G. F. LEIGER.
MACHINE FOR MAKING CAN BODIES.
APPLICATION FILED OCT. 20, 1903.

5 SHEETS—SHEET 1.

Witnesses:
J. B. Weir
Edward G. Eisfeldt

Inventor:
George F. Leiger
by Bond Adams Pickard & Jackson
Attys

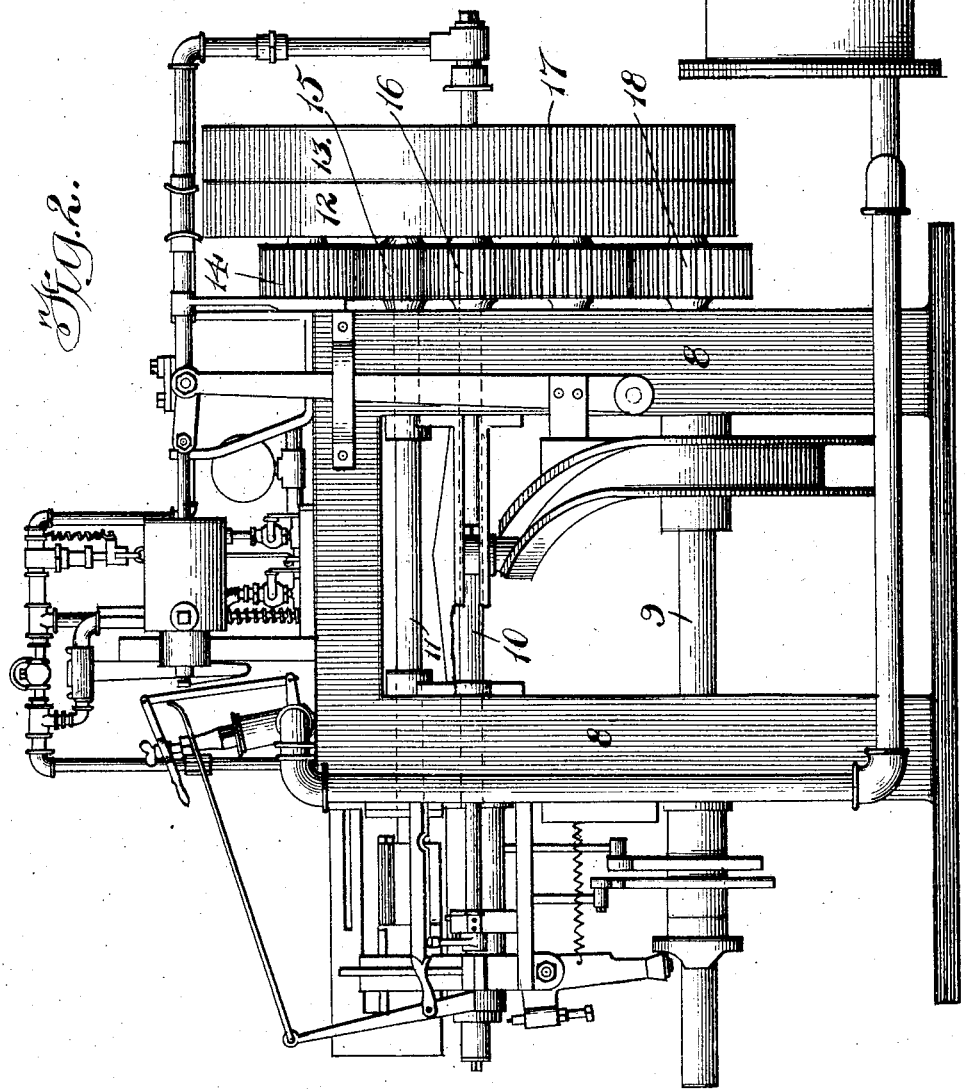

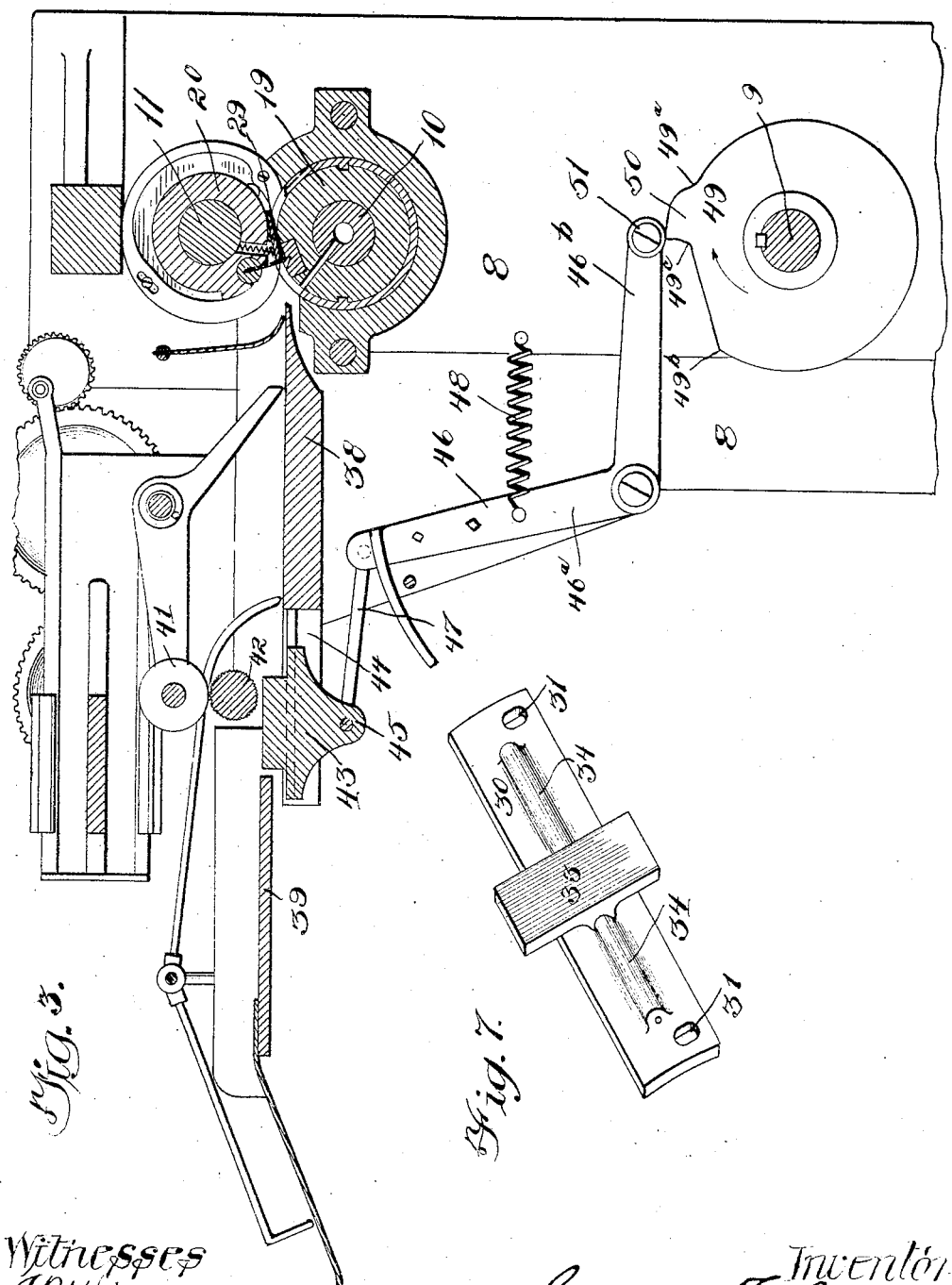

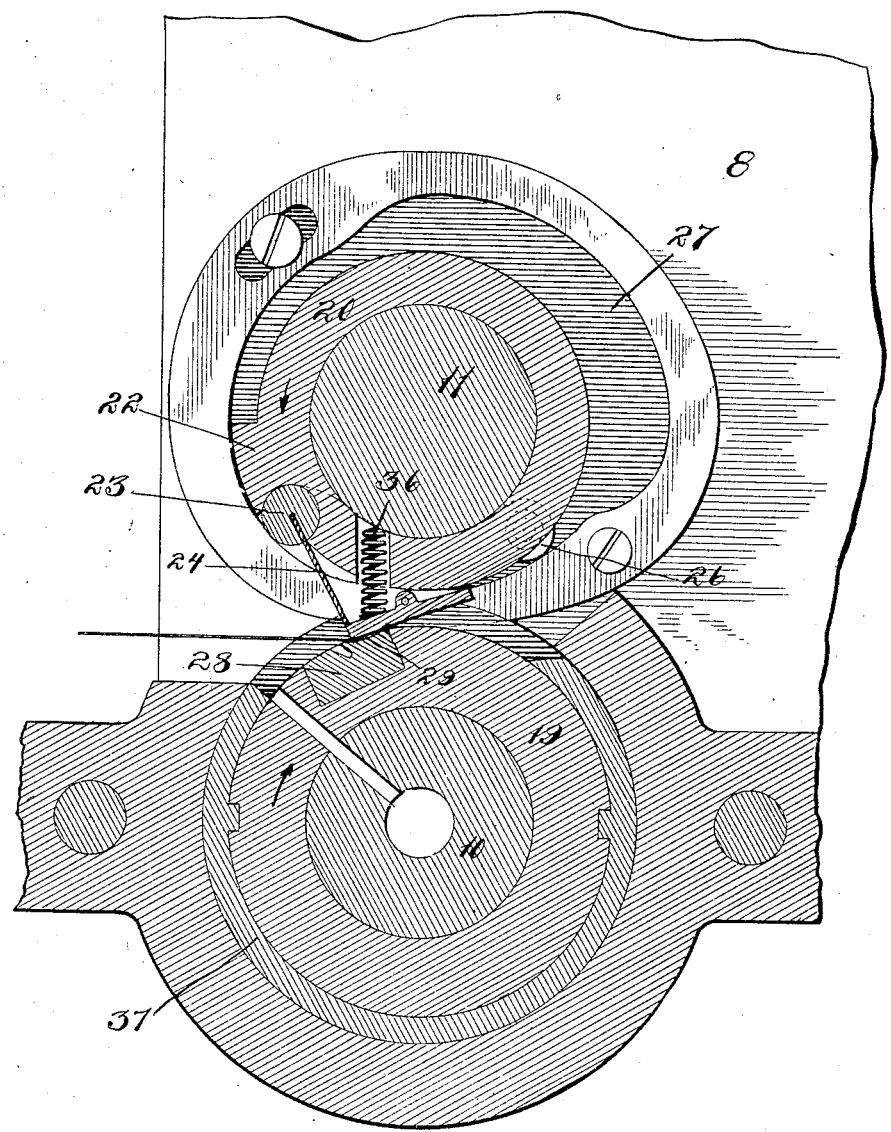

No. 786,302. PATENTED APR. 4, 1905.
G. F. LEIGER.
MACHINE FOR MAKING CAN BODIES.
APPLICATION FILED OCT. 20, 1903.
5 SHEETS—SHEET 5.
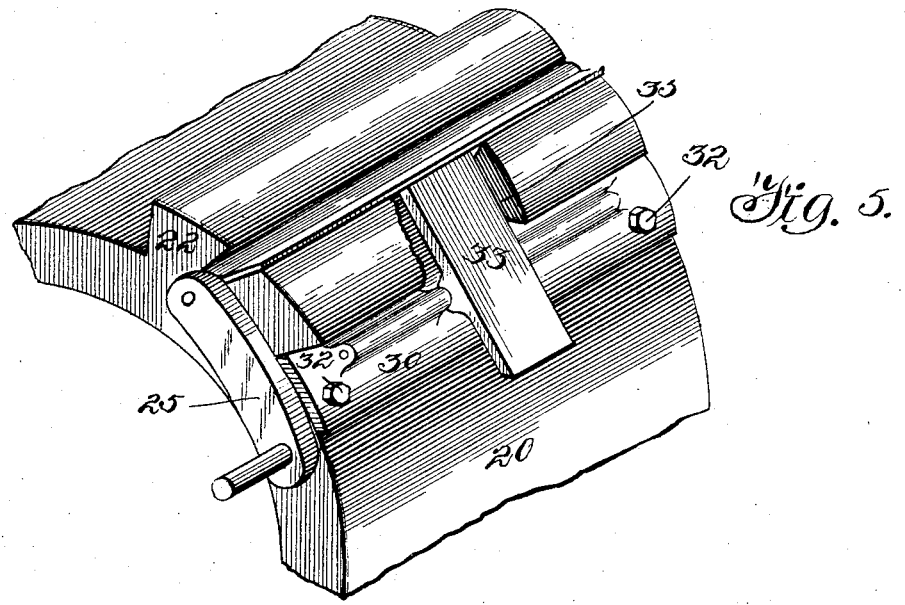
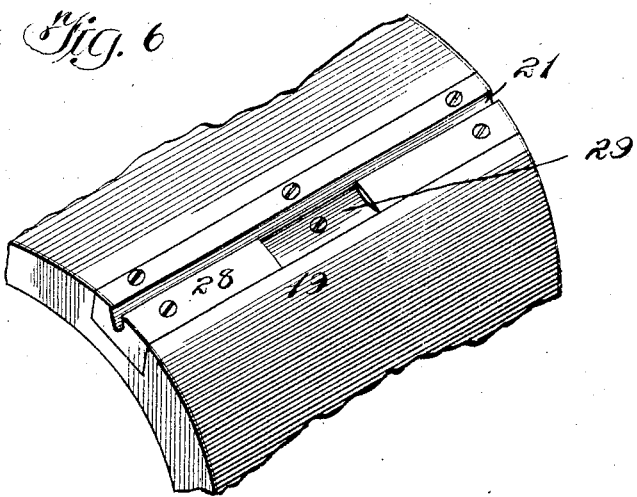

No. 786,302.       Patented April 4, 1905.

UNITED STATES PATENT OFFICE.

GEORGE F. LEIGER, OF CHICAGO, ILLINOIS, ASSIGNOR, BY MESNE ASSIGNMENTS, TO THE L. BENEDICT COMPANY, OF CHICAGO, ILLINOIS, A CORPORATION OF ILLINOIS.

MACHINE FOR MAKING CAN-BODIES.

SPECIFICATION forming part of Letters Patent No. 786,302, dated April 4, 1905.

Application filed October 20, 1903. Serial No. 177,821.

*To all whom it may concern:*

Be it known that I, GEORGE F. LEIGER, residing at Chicago, in the county of Cook and State of Illinois, have invented certain new and useful Improvements in Machines for Making Can-Bodies, of which the following is a specification, reference being had to the accompanying drawings.

My invention relates to machines for forming can-bodies or similar cylindrical bodies formed from sheet metal and having the side seams interlocked, and more particularly relates to improvements upon Letters Patent No. 693,325, dated February 11, 1902, and No. 732,004, dated June 23, 1903, both granted upon my application; and its principal object is to provide a means by which the front edge of the sheet of metal to be formed into a can-body may be accurately delivered to the can-body-forming and side-seam-interlocking mechanism and accurately gaged to the knife and slot which form the interlocking side seam in such a way that the sheet of metal will always project over the slot in which the interlocking seams are formed by the coöperation of the knife such a distance as to insure the proper formation of the interlocking seam.

Some difficulty has been experienced heretofore in machines of this type, owing to the difficulty of producing sheets of metal of exactly the same size and thickness, in so accurately delivering the sheets to the knife and slot which form the interlocking seams as to insure just the right amount of metal projecting over the slot to be operated upon by the knife. It will be obvious, for instance, if the sheet of metal did not project a sufficient distance over the slot a complete interlock of the seam would not be formed by the operation of the knife which forces the metal into the slot. If, on the other hand, the sheet of tin were a little too long and projected too far over the slot, a portion of the edge of the metal would project beyond the edge of the slot after the metal was forced into the slot by the knife, which might destroy and would render clumsy and awkward the interlocking of the side seams.

It is the chief object of my invention to overcome this difficulty; and to that end my invention consists generally in placing a gage upon the upper roller or knife-carrying roller of the pair of rollers by which the can-bodies are formed, which will be projected automatically into the path of the advancing sheet and will hold its front edge at such a distance in advance of the groove in the under roller as to insure the front edge of the sheet projecting over the groove at just the proper amount to insure the knife tucking the tin of the forward edge of the sheet into the groove to form the first of the interlocking seams with certainty and precision.

My invention further consists in mechanism by which a sheet of tin will be fed forward so as to throw its front edge firmly and accurately against the said gage.

The further object of my invention is to improve can-body-forming machinery in sundry details hereinafter pointed out.

In the accompanying drawings, Figure 1 is an end elevation. Fig. 2 is a front elevation. Fig. 3 is an enlarged detail, being a vertical section from rear to front of the can-body-forming rolls and table, showing the essential features of the machine so far as my present invention is concerned. Fig. 4 is an enlarged detail, being a section through the can-body-forming rolls. Fig. 5 is an enlarged detail, being a view of a portion of the upper roll, showing the adjustable gage and its method of attachment to the roll. Fig. 6 is an enlarged detail, being a view of a portion of the under roll, showing the slot in which the interlocking side seams are formed and the depression into which the gage drops when in operation; and Fig. 7 is an enlarged detail, being a view of the gage and the plate by which it is secured to the upper roll.

Referring to the drawings, 8 indicates the framework of the machine, in which are journaled shafts 9, 10, and 11.

12 13 indicate, respectively, fast and loose pulleys mounted upon the shaft 10.

14, 15, 16, 17, and 18 indicate gearing by which the various operating parts of the machine are driven. This gearing is the same and operates in the same manner as is described in Letters Patent No. 732,004, dated June 23, 1903, granted upon my application, but may be of any approved construction.

19 20 indicate rollers which are keyed or otherwise secured, respectively, to shafts 10 and 11. The roller 19 is provided with a slot 21 upon its periphery, which is projected into the roller at an angle with a tangent to the roller at said point in the manner shown and fully described in Letters Patent No. 693,325, dated February 11, 1903, granted upon my application. The roller 20 is provided with a projecting portion 22, whose surface is concentric with the shaft 11. 23 indicates a rock-shaft mounted in said projecting portion 22 and carrying a knife 24, which is operated by a lever 25, and roller 26, operating in a cam-groove 27, mounted upon the framework 8. As I prefer to construct the machine the slot 21 is formed in a separate plate 28, which is secured in a suitable recess in the roll 19, as is described in Letters Patent No. 732,004 and as is best shown in Figs. 4 and 6. The operation of the rolls 19 and 20, the groove 27, and the knife 24 in forming can-bodies or other cylindrical bodies of sheet metal with the side seams interlocked is exactly the same as is described in Letters Patent No. 693,325, above referred to, and will be generally noted hereinafter.

29 indicates a depression in the plate 28 immediately in advance of the slot 21 as the roller 19 rotates.

Referring particularly to Figs. 4, 5, 6, and 7, where it is most clearly illustrated, 30 indicates a plate which is secured to the surface of the roll 20 immediately in advance of the forward side of the projection 22 in the direction of the rotation of said roller. The plate 30 is provided with two elongated slots 31, through which pass screws 32, by means of which the plate 30 is secured to the roll 20. By loosening the screws 32 by means of the elongated slots 31 the position of the plate 30 upon the roller 20 may be slightly shifted, so as to bring it nearer to or farther away from the projection 22. 33 indicates a gage which is pivotally mounted between bearings 34 on the surface of the plate 30. The end of said plate which is forward in the direction of the rotation of the roll 20 projects out over the surface of the roll 20, and the other end projects into a recess 35, cut in the projection 22. 36 indicates a spring which is mounted in a suitable opening in the roll 20 and which bears upon the under side of the gage 33 and tends by its expansion to normally hold the end of the gage 33, upon which it bears outward away from the roller 20, in the position best shown in Fig. 4. The other end of the gage bears upon the surface of the roll 20.

37 (see Fig. 4) indicates a ring which operates to push the can-body when the side seams are formed and interlocked from the roll 19. The ring 37 is operated in exactly the same manner as is shown and described in said Letters Patent No. 732,004, but may be operated in any approved way and, forming no part of my present invention, it is believed needs no further description here.

38 indicates a table mounted upon the feed side of the machine and projecting forward near to and partially between the rolls 19 and 20.

39 indicates a table adapted to contain a pile of sheet-metal plates from which the plates to be formed into can-bodies are fed to the machine.

40 indicates pneumatic picker mechanism by means of which when a pile of sheets of metal are placed upon the table 39 the top sheet is automatically fed at suitable intervals forward between rollers 41 42 and by them deposited upon the upper surface of the table 38. The picker mechanism, the table 39, the end rollers 41 42, and the feed devices are the same as those shown in said Letters Patent No. 732,004 and operate in precisely the same manner as is fully described in said Letters Patent. Inasmuch as all these parts are, as was said, precisely like the parts shown and fully described in said Letters Patent No. 732,004 and operate in the same manner and inasmuch as they form no part of my present invention, but are shown so far as illustrated to show a complete machine, it is believed no further description of them is necessary here. Besides, any other approved form of mechanism for feeding the sheets to the table 38 may be employed, if desired.

43 indicates a block which is slidingly mounted in a suitable slot 44 in the table 38 and is provided with a downward projection 45.

46 indicates a bell-crank lever having arms $46^a$ $46^b$ and pivotally mounted upon the framework 8.

47 indicates a link which is pivotally connected at one end with the projection 45 of the sliding block 43 and at the other end to the upper end of the arm $46^a$.

48 indicates a retractile spring which is connected at its forward end with the framework 8 and at its rear end with the arm $46^a$ of the bell-crank lever 46 and tends by its contraction to draw the arm $46^a$, and with it the block 43, forward.

The block 43, as is best shown in Fig. 3, projects upward through the slot 44 above the upper surface of the table 38, so as to engage the rear end of a sheet of metal which has been fed upon said table 38 by the picker mechanism 40 and rolls 41 42, above referred to.

49 indicates a cam which is keyed or otherwise secured to the shaft 9. As is best shown in Fig. 3, the surface of the cam 49 curves from the point $49^a$ to the point $49^b$, extending gradually farther and farther from the central point of the shaft 9—from $49^a$ to $49^b$. From $49^b$ to $49^c$ the cam-surface is a straight line, approaching from 49$^b$ to 49$^c$ nearer to the axis of the shaft 9. The cam 49 is also provided with a projection 50, whose outer surface is circular concentric with the shaft 9.

51 indicates a roller which is journaled upon the outer end of the arm 46$^b$ of the bell-crank lever 46. The cam 49 rotates in the direction shown by the arrow in Fig. 3, and in said figure the roller 51 is shown as just at the point of leaving the cam.

The operation of the parts above described is as follows: When the machine is in operation, a sheet of metal is fed by the picker mechanism 40 and rolls 41 and 42 from the top of a pile of sheets upon the table 38 in the manner described in said Letters Patent No. 732,004. The parts are so adjusted that at the time a sheet is deposited upon the table 38 the roller 51 upon the arm 46$^b$ of the bell-crank lever 46 has reached the point 49$^b$ of the cam 49. As the surface of the cam upon which said roller 51 bears—from the point 49$^b$ to the point 49$^a$—projects nearer to the axis of the shaft 9, upon which said cam is mounted, the spring 48, which keeps the roller 51 upon the surface of the cam, will draw forward the arm 46$^a$ of the bell-crank lever 46, which will move the block 43 forward. The block 43, engaging the rear edge of the sheet metal deposited upon the table 38, will push it forward toward the rolls 19 and 20, to be operated upon by the knife 24 and slot 21. This movement of the block 43, however, will not quite bring forward the edge of the sheet into position to be operated upon. This will await the next movement of the block 43. In the meanwhile the can-body-forming rollers 19 and 20, being rotated in the direction indicated by arrows on Figs. 3 and 4, have been brought into position where the knife and groove are about to operate—that is to say, in the position shown in Figs. 3 and 4. At this point and just before the knife and groove operate the rear end of the gage 33, forced outward by the spring 36, drops into the depression 29 in the roller 19 a short distance in advance of the slot 21 as the rollers 19 and 20 rotate. The distance in advance of the slot 21, which the rear end of the gage 33 takes when dropped into this position, may be varied by the adjustment of the plate 30 upon the roll 20, above described, and will depend upon the character of the metal used. Inasmuch as the gage 33 operates as a stop to the forward edge of the sheet of tin when projected into a position to be operated upon, as hereinafter described, the adjustment of the gage 33 by means of the plate 30 and the screws 32 will be such that the portion of the sheet projecting over the slot 21, limited by the gage 33, will be enough to form an interlocking seam when operated upon by the knife 24. Just before the rolls and the gage have reached the position just described the roller 51 has reached the projection 50 and is retained by the same, forcing upward the arm 46$^b$ of the lever 46 and moving the block 43 a short distance back away from the rear edge of the sheet. Just as the rollers and the gage have reached the position above described and immediately before the knife is ready to operate the roller 51 reaches the position shown in Fig. 3, and thereupon passing off from the projection 50 drops to the point 49$^b$ under the action of the spring 48, which causes a quick forward motion of the arm 46$^a$ and of the block 43. By the first motion of the block 43 above described the forward edge of the sheet has been brought almost to a position in which it would contact the gage 33; but inasmuch as the distance from the point 49$^b$ on the cam 49 from the point 49$^c$ to the axis of the shaft 9 is less than the distance from the point 49$^a$ to the axis of the shaft 9 the sudden forward motion of the block 43 will throw the sheet still farther quickly forward and press it firmly against the rear end of the gage 33, the amount of motion of the operating parts being of course properly adjusted. This insures the forward edge of the sheet being forced against and held firmly to the rear end of the gage 33 and makes it sure that the forward edge of the sheet of metal to be operated upon projects sufficiently forward of the slot 21 to insure a proper formation of an interlocking seam by the knife in coöperation with said slot. Inasmuch as the rear end of the gage 33 is, as is stated above, forced outward into the slight depression 29 on the roller 19 by the action of the spring 36, the forward edge of the sheet of tin cannot be thrown under the gage, but must come directly against it. Immediately after the second forward thrust of the block 43, caused by the roller 51 passing from the projection 50, the roller 51 rides up the straight portion of the cam from 49$^c$ to 49$^b$, forcing the block 43 backward ready for another operation upon a second sheet. Immediately upon the forward edge of the sheet being forced against the gage 33 the knife 24 operates and forces the tin into the slot 21, forming the first interlocking seam of the cylindrical metal body in exactly the same manner as is described in the Letters Patent No. 693,325, above mentioned, and from that time on the further operations of forcing the rear edge of the sheet into the slot 21 to interlock the side seams, the pushing of the cylindrical body thus formed from the rollers, the hammering of the seams, and the ejecting of the cam from the machine are precisely the same as those described in the above-named Letters Patent No. 732,004 and No. 693,325 and form no part of my present invention. Besides, so far as my present invention is concerned any other approved mechanism may be used to hammer the interlocked seam and discharge the cans from the rolls. It is believed, therefore, that it is not necessary to describe them here.

That which I claim as my invention, and desire to secure by Letters Patent, is—

1. The combination with coöperating rollers adapted to form a sheet of metal into a cylinder, and mechanism carried thereby to form and interlock the side seam of said cylinder, of a gage mounted on one of said rollers and adapted as said roller rotates to be automatically projected into the path of a sheet of metal advancing to said rollers and contact with the front edge thereof, substantially as described.

2. The combination with coöperating rollers adapted to form a sheet of metal into a cylinder, and mechanism carried thereby to form and interlock the side seam of said cylinder, of a gage mounted on one of said rollers in advance of said side-seam-interlocking mechanism and adapted to be automatically projected into the path of a sheet of metal advancing to said rollers and contact with the front edge of said sheet and limit its forward movement into said side-seam forming and interlocking mechanism, substantially as described.

3. The combination with coöperating rollers adapted to form a sheet of metal into a cylinder, and mechanism carried thereby to form and interlock the side seams thereof, of a gage mounted on one of said rollers in advance of and adjustable with reference to said side-seam-interlocking mechanism and adapted to be automatically projected into the path of a sheet of metal advancing toward said rollers and contact with the front edge of said sheet and limit its forward movement into said side-seam forming and interlocking mechanism, and mechanism for feeding a sheet of metal against said gage, substantially as described.

4. The combination with a roller provided with a slot, and a second member adapted to coöperate with said roller to form a cylindrical can-body thereon and interlock the side seam of the same, of a gage mounted on said second member, a recess on said roller in advance of said slot, and mechanism adapted to automatically project said gage into said recess into the path of a sheet of metal advancing to said roller as said roller rotates and limit the forward motion of said sheet of metal, substantially as described.

5. The combination with a roller provided with a slot on its periphery, of a second member adapted to coöperate with said roller to form a cylindrical can-body thereon and interlock the side seam of the same, a gage pivoted on said second member, a recess on said roller in advance of said slot, mechanism adapted to automatically project said gage into said recess into the path of a sheet of metal advancing to said roller as said roller rotates and limit the forward motion of said sheet of metal, and mechanism adapted to feed a sheet of metal against said gage, substantially as described.

6. The combination with a roller provided with a slot on its periphery, and a second member adapted to coöperate with said roller to form a cylindrical can-body thereon and interlock the side seam of the same, of a gage pivoted on said second member and adjustable thereon with relation to the slot on said roller, a recess on said roller in advance of said slot, and mechanism adapted to automatically project said gage into said recess in the path of a sheet of metal advancing to said roller as said roller rotates and limit the forward motion of said sheet of metal, substantially as described.

7. The combination with rotary can-body-forming and side-seam-interlocking mechanism, of a gage carried on said can-body-forming mechanism adapted to be automatically projected into the path of a sheet of metal entering said can-body-forming mechanism and to limit its forward motion into said can-body-forming mechanism, a block adapted to contact with a sheet of metal, and mechanism adapted to give to said block a movement at a speed greater than the surface speed of said can-body-forming mechanism to force said sheet of metal against said gage, substantially as described.

8. The combination with coöperating rollers adapted to form a sheet of metal into a cylinder and mechanism carried thereon to form and interlock the side seam of said cylinder, of a gage mounted on one of said rollers and adapted as said rollers rotate to be automatically projected into the path of a sheet of metal advancing to said rollers and to contact with the front edge thereof and limit its forward motion into said mechanism, a block adapted to contact with the rear end of a sheet of metal, mechanism adapted to move said block to forward said sheet of metal toward said rollers, and mechanism adapted to give to said block a second forward movement to force the forward edge of said sheet of metal against said gage, substantially as described.

9. The combination with a roller 19 provided on its periphery with a slot 21 and with a recess 29 in advance of said slot as said roller rotates, a second member 20 provided with a projection 22, a knife 24 mounted in said second member 20 and adapted to coöperate with said slot to form and interlock the side seam of a sheet of metal and form the same into a cylindrical can-body on said roller 19, and mechanism for operating said roller and said knife, of a gage 33 pivotally mounted on said second member 20 in advance of said projection and adjustable on said member 20, and means adapted to force the rear end of said gage 33 into said recess 29 as said rollers rotate, into the path of a sheet of metal advancing to said roller and second member, substantially as described.

10. The combination with a roller 19 provided on its periphery with a slot 21 and with a recess 29 in advance of said slot as said roller rotates, of a second member 20 provided with a projection 22, a knife 24 mounted in said second member 20 and adapted to coöperate with said slot to form and interlock the side seam of a sheet of metal and form the same into a cylindrical can-body on said roller 19, and mechanism for operating said roller and said knife, of a gage 33 pivotally mounted on said second member 20 in advance of said projection and adjustable on said member 20, means adapted to force the rear end of said gage 33 into said recess 29 as said roller rotates and into the path of a sheet of metal advancing to said roller and said second member, of a table adjacent to said roller and said second member, a block slidingly mounted in said table and adapted to engage the rear end of a sheet of metal laid on said table, means for giving said block a forward motion to advance said sheet of metal toward said roller 19, and mechanism adapted to give to said block a second forward motion at a speed greater than the surface speed of the roller 19 and force the front edge of said sheet of metal against said gage, substantially as described.

GEORGE F. LEIGER.

Witnesses:
ALBERT H. ADAMS,
MINNIE A. HUNTER.